United States Patent
Baldovino et al.

(10) Patent No.: US 12,078,753 B2
(45) Date of Patent: Sep. 3, 2024

(54) SENSOR-DRAINAGE APPARATUS

(71) Applicant: Ford Global Technologies, LLC, Dearborn, MI (US)

(72) Inventors: Segundo Baldovino, Novi, MI (US); Rashaun Phinisee, Ypsilanti, MI (US); Venkatesh Krishnan, Canton, MI (US); Matthew Rhodes, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1060 days.

(21) Appl. No.: 16/988,956

(22) Filed: Aug. 10, 2020

(65) Prior Publication Data
US 2022/0043120 A1 Feb. 10, 2022

(51) Int. Cl.
*G01S 7/481* (2006.01)
*G05D 1/00* (2024.01)

(52) U.S. Cl.
CPC .......... *G01S 7/4813* (2013.01); *G05D 1/0088* (2013.01)

(58) Field of Classification Search
CPC .......... G01S 7/4813; B44D 3/128; B44D 3/12
USPC ..................... 359/507; 52/11, 12, 13, 14, 15
See application file for complete search history.

(56) References Cited

U.S. PATENT DOCUMENTS

| | | | | | |
|---|---|---|---|---|---|
| 3,417,519 | A | * | 12/1968 | Hitter | E04D 3/362 52/75 |
| 4,473,973 | A | * | 10/1984 | Lane | E04D 13/064 52/60 |
| 5,388,002 | A | * | 2/1995 | Smith | G02B 7/02 359/507 |
| 6,050,030 | A | * | 4/2000 | Wax, Sr. | E04D 3/3607 52/11 |
| 2002/0139807 | A1 | * | 10/2002 | Lucey | B44D 3/12 220/698 |
| 2006/0096989 | A1 | * | 5/2006 | Lucey | B44D 3/12 220/495.11 |
| 2008/0251525 | A1 | * | 10/2008 | Fontaine | B44D 3/121 220/756 |
| 2011/0073142 | A1 | | 3/2011 | Hattori et al. | |

OTHER PUBLICATIONS

Ouster's Next Step: 128 Channel Lidar Sensors, Long Range, and an Ultra-wide field of View retrieved from "https://www.pressebox.com/pressrelease/general-laser-tochev-tochev-og/Ousters-Next-Step-128-Channel-Lidar-Sensors-Long-Range-and-an-Ultra-Wide-Field-of-View/boxid/988013" (Year: 2020).*

* cited by examiner

*Primary Examiner* — Ephrem Z Mebrahtu
(74) *Attorney, Agent, or Firm* — Frank A. MacKenzie; Bejin Bieneman PLC

(57) ABSTRACT

A sensor apparatus includes a cylindrical sensor window defining an axis oriented vertically, and a sensor-housing top mounted on the sensor window. The sensor-housing top includes a top surface and a wall. The axis intersects the top surface. The wall extends upward from the top surface and is elongated circumferentially partially around the top surface. The top surface includes a plurality of parallel ridges elongated from the wall.

17 Claims, 4 Drawing Sheets

SENSOR-DRAINAGE APPARATUS

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
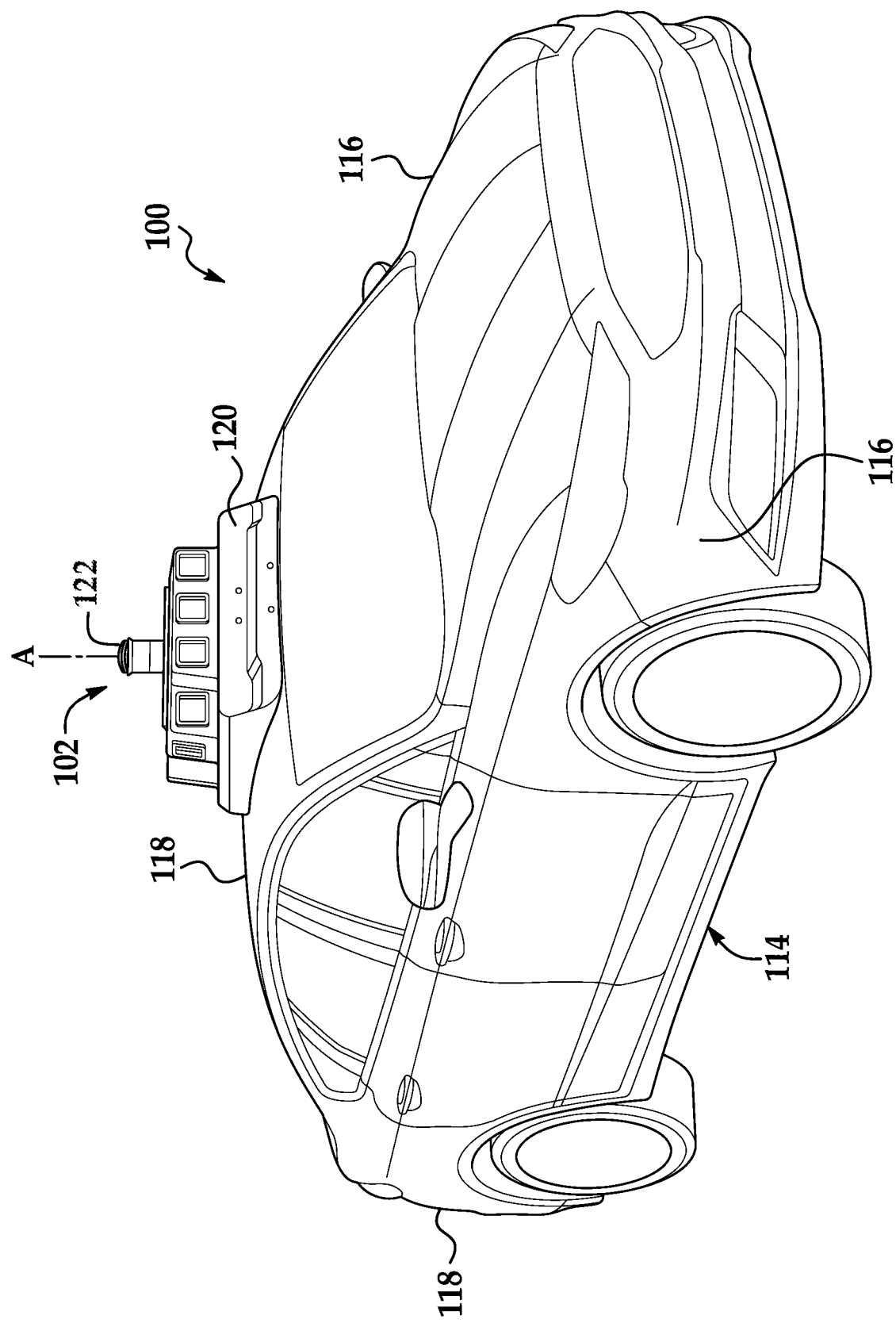
FIG. 1 is a perspective view of an example vehicle including a housing for sensors.

A sensor apparatus includes a cylindrical sensor window defining an axis oriented vertically and a sensor-housing cap mounted on the sensor window. The sensor-housing cap includes a top surface and a wall. The axis intersects the top surface. The wall extends upward from the top surface and is elongated circumferentially partially around the top surface. The top surface includes a plurality of parallel ridges elongated from the wall.

The sensor-housing cap may include a gutter elongated circumferentially around the axis and positioned below the top surface, above the sensor window, and radially outside the top surface relative to the axis. The gutter may be elongated circumferentially at least 270° around the axis.

The sensor-housing cap may include a channel extending radially outward relative to the axis from the gutter. The gutter may be elongated circumferentially around the axis from the channel to the channel. The channel may extend from a lowest point of the gutter.

The wall may have a midpoint about which the wall is symmetrical, and a vertical plane may extend through the midpoint of the wall, the axis, and the channel.

The top surface may slope downward from the wall in a direction parallel to the ridges.

The wall may be elongated circumferentially at most 180° around the axis.

The wall may have a midpoint about which the wall is symmetrical, and the ridges may be parallel to a vertical plane containing the axis and the midpoint of the wall.

The top surface may include a plurality of troughs alternated with the ridges, and at least one of the troughs may be wider than the ridges adjacent to that trough.

The top surface may include a plurality of troughs alternated with the ridges, and each ridge may include two side surfaces extending upward at oblique angles from the troughs.

The sensor-housing cap may include a ramp elongated circumferentially around the axis and positioned below the top surface, above the sensor window, and radially outside the top surface relative to the axis. The ramp may have a cross-section elongated circumferentially around the axis, and the cross-section may extend upwardly and radially outwardly. The ramp may be elongated circumferentially at least 270° around the axis.

The sensor-housing cap may be a single piece.

With reference to the Figures, a sensor apparatus 102 for a vehicle 100 includes a cylindrical sensor window 104 defining an axis A oriented vertically, and a sensor-housing cap 106 mounted on the sensor window 104. The sensor-housing cap 106 includes a top surface 108 and a wall 110. The axis A intersects the top surface 108. The wall 110 extends upward from the top surface 108 and is elongated circumferentially partially around the top surface 108. The top surface 108 includes a plurality of parallel ridges 112 elongated from the wall.

The shape of the sensor-housing cap 106 can help shed water in the event of driving through precipitation, especially heavy precipitation. The wall 110 can prevent water from draining in a vehicle-forward direction from the top surface 108, which would be in the forward-facing portion of the field of view through the sensor window 104. The ridges 112 can direct water on the top surface 108 in a vehicle-rearward direction rather than laterally. The shape of the sensor-housing cap 106 is also beneficial for heat dissipation. The ridges 112 act as fins for heat dissipation, and fluid flow directed over the sensor-housing cap 106 also provides for significant heat transfer out of sensor-housing cap 106.

With reference to FIG. 1, the vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input.

The vehicle 100 includes a body 114. The body 114 includes body panels 116 partially defining an exterior of the vehicle 100. The body panels 116 may present a class-A surface, e.g., a finished surface exposed to view by a customer and free of unaesthetic blemishes and defects. The body panels 116 include, e.g., a roof 118, etc.

A housing 120 for a sensor 122 including the sensor window 104 and the sensor-housing cap 106 and for other sensors is attachable to the vehicle 100, e.g., to one of the body panels 116 of the vehicle 100, e.g., the roof 118. For example, the housing 120 may be shaped to be attachable to the roof 118, e.g., may have a shape matching a contour of the roof 118. The housing 120 may be attached to the roof 118, which can provide the sensors with an unobstructed field of view of an area around the vehicle 100. The housing 120 may be formed of, e.g., plastic or metal.

Figure 2:
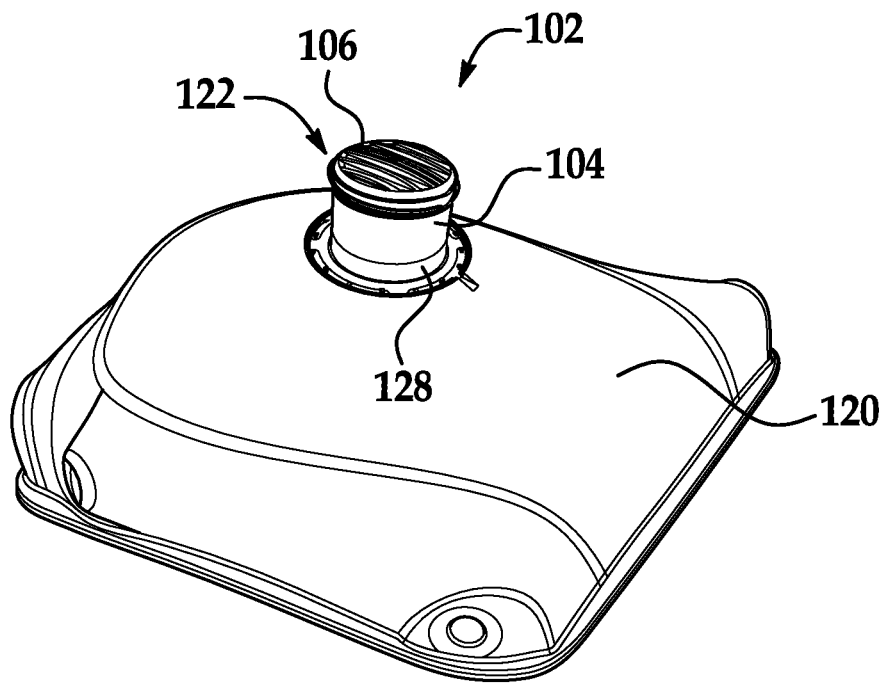
FIG. 2 is a rear perspective view of the housing.

With reference to FIG. 2, the sensor apparatus 102 includes the sensor 122. The sensor 122 is supported by the housing 120. The sensor 122 can be disposed on top of the housing 120 at a highest point of the housing 120. The sensor 122 has a cylindrical shape and defines the axis A.

The sensor 122 may be designed to detect features of the outside world; for example, the sensor 122 may be a radar sensor, a scanning laser range finder, a light detection and ranging (LIDAR) device, or an image processing sensor such as a camera. In particular, the sensor 122 may be a LIDAR device, e.g., a scanning LIDAR device. A LIDAR device detects distances to objects by emitting laser pulses at a particular wavelength and measuring the time of flight for the pulse to travel to the object and back. The operation of the sensor 122 is performed by a sensing device 124 inside a sensor housing 126. The sensor 122 has a field of view through the sensor window 104 encompassing a region from which the sensor 122 receives input.

Figure 3:
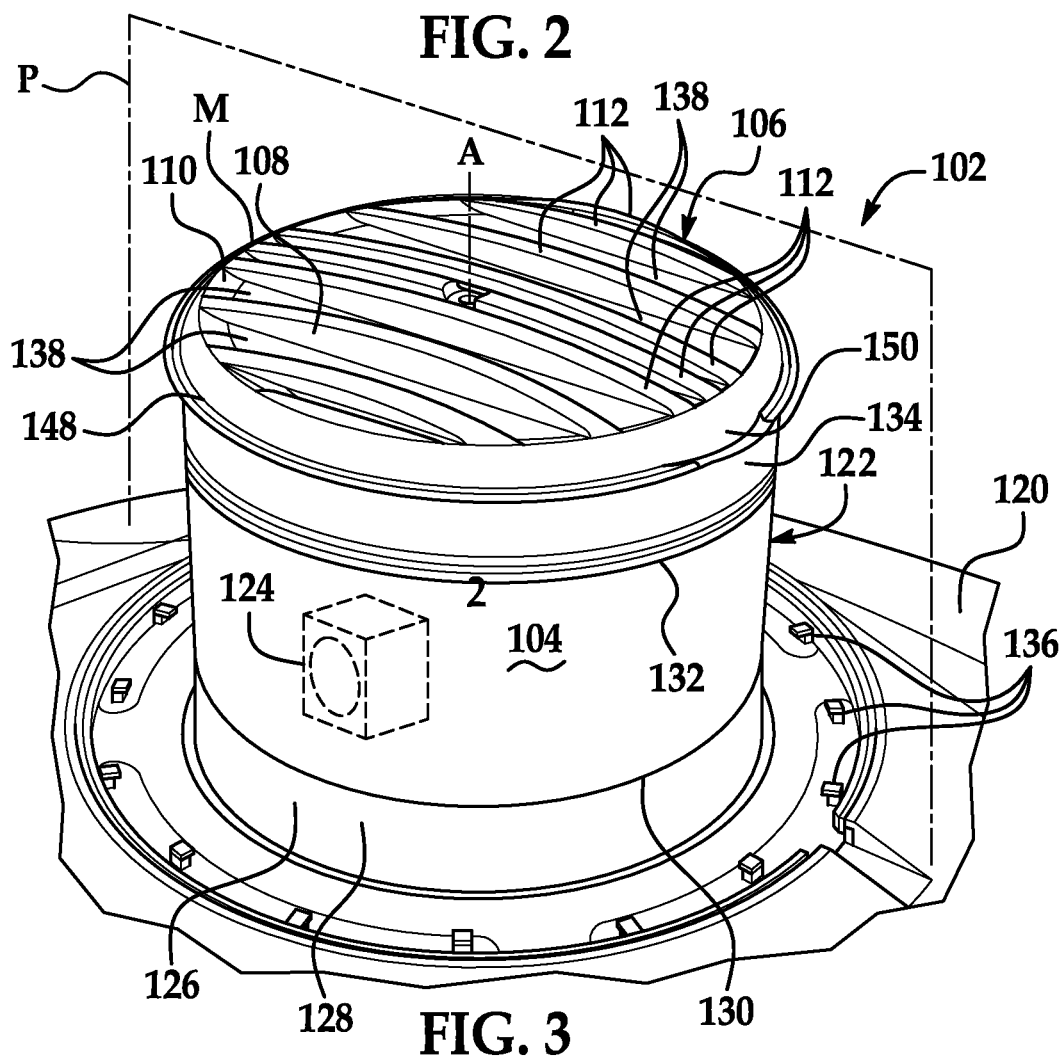
FIG. 3 is a rear perspective view of a sensor mounted on the housing.

With reference to FIG. 3, the sensor 122 includes the sensor housing 126. The sensor housing 126 includes the sensor-housing cap 106, the sensor window 104, and a sensor-housing base 128. The sensor-housing cap 106 is disposed directly above the sensor window 104, and the sensor-housing base 128 is disposed directly below the sensor window 104. The sensor-housing cap 106 and the sensor-housing base 128 are vertically spaced apart by a height of the sensor window 104.

The sensor window 104 is oriented generally vertically, i.e., extends up and down. The sensor window 104 is cylindrical and defines the axis A, which is oriented vertically. The sensor window 104 extends around the axis A. The sensor window 104 can extend fully around the axis A, i.e., 360°, or partially around the axis A. The sensor window 104 extends along the axis A, i.e., vertically, from a bottom edge 130 to a top edge 132. The bottom edge 130 contacts the sensor-housing base 128, and the top edge 132 contacts the sensor-housing cap 106. The sensor window 104 has an outer diameter. The outer diameter of the sensor window 104 may be the same as an outer diameter of the sensor-housing cap 106 and/or of the sensor-housing base 128; in other words, the sensor window 104 114 may be flush or substantially flush with the sensor-housing cap 106 and/or the sensor-housing base 128. "Substantially flush" means a seam between the sensor window 104 and the sensor-housing cap 106 or sensor-housing base 128 does not cause turbulence in air flowing along the sensor window 104. At least some of the sensor window 104 is transparent with respect to whatever medium the sensor 122 is capable of detecting. For example, if the sensor 122 is a LIDAR device, then the sensor window 104 is transparent with respect to visible light at the wavelength generated by the sensing device 124. The field of view of the sensor 122 extends through the sensor window 104.

The sensor-housing cap 106 is disc-like in shape and defines the axis A. The sensor-housing cap 106 extends upward from the sensor window 104. The sensor-housing cap 106 is mounted on and fixed relative to the sensor window 104. The sensor-housing cap 106 is positioned to receive heat generated by the sensing device 124 responsible for the operation of the sensor 122; for example, the sensor-housing cap 106 is directly above the sensing device 124, and convection transfers heat via the air inside the sensor housing 126 from the sensing device 124 to the sensor-housing cap 106.

The sensor-housing cap 106 is a single piece, i.e., made of a single, uniform piece of material with no seams, joints, fasteners, or adhesives holding it together. This can make manufacturing the sensor-housing cap 106 easier, and can help heat transfer through the sensor-housing cap 106. The sensor-housing cap 106 can be a thermally conductive polymer, i.e., a polymer with high thermal conductivity for a polymer, e.g., a thermal conductivity equal to at least 1.0 watts per meter-Kelvin (W/(m K)), e.g., greater than 5 W/(m K), at 25° C. Alternatively, the sensor-housing cap 106 can be a thermally conductive metal, e.g., aluminum, with a thermal conductivity equal to at least 15 watts per meter-Kelvin (W/(m K)), e.g., greater than 100 W/(m K), at 25° C.

The sensor apparatus 102 includes a plurality of air nozzles 136. The air nozzles 136 are mounted on the housing 120. The air nozzles 136 are positioned below the sensor window 104 and are arranged circumferentially around the sensor housing 126. The air nozzles 136 are aimed upward, e.g., aimed in a direction parallel to the axis A. The air nozzles 136 can receive airflow from, e.g., a compressor or blower (not shown).

Figure 4:
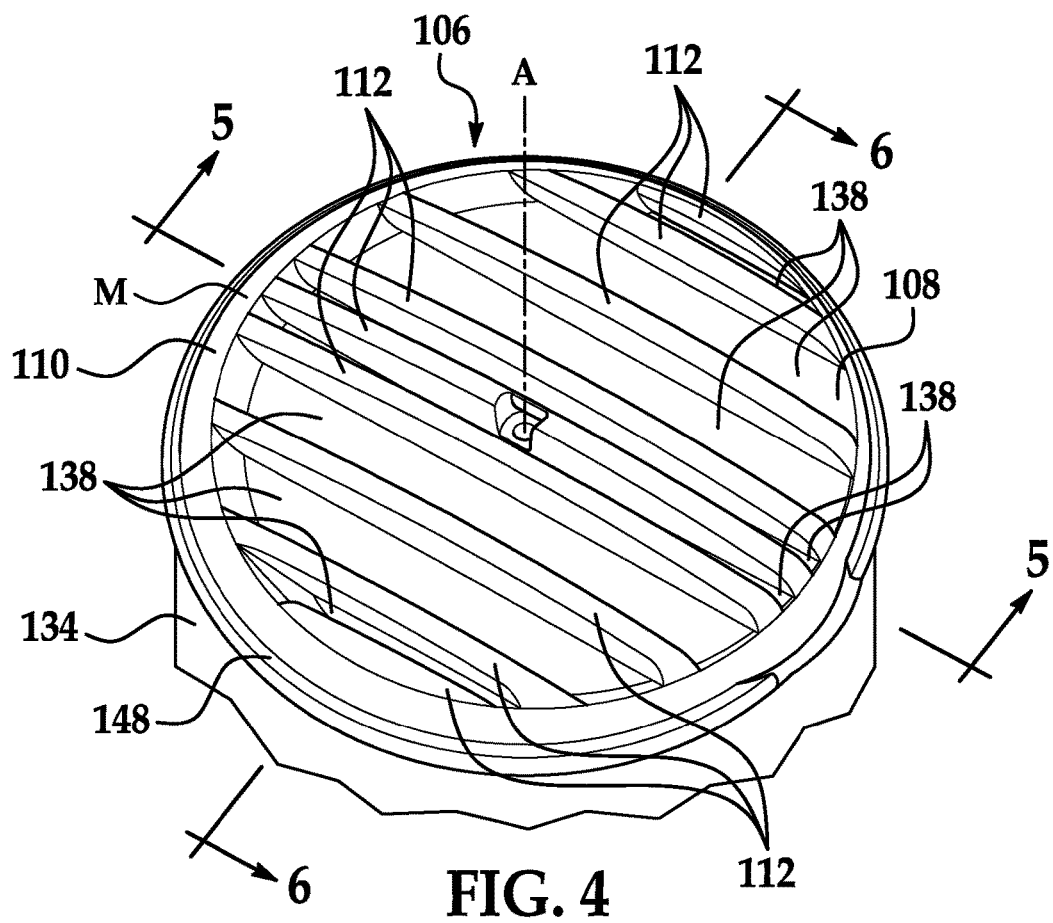
FIG. 4 is a perspective view of a sensor-housing cap of the sensor.

With reference to FIG. 4, the sensor-housing cap 106 includes a lateral surface 134, the top surface 108, and the wall 110. The top surface 108 faces generally upward with a slight vehicle 100-rearward tilt, and the lateral surface 134 faces horizontally outward, i.e., radially relative to the axis A. The lateral surface 134 extends vertically upward from the top edge 132 of the sensor window 104 to the wall 110 or the top surface 108. The top surface 108 is oriented generally horizontally, transverse to the lateral surface 134. Specifically, the top surface 108 slopes downward gradually from front to back, i.e., from the wall 110 in a direction parallel to the ridges 112. For example, the slope of the top surface 108 can be approximately 1° from horizontal. The slope permits water to drain rearward from the top surface 108. The axis A intersects the top surface 108. The top surface 108 has a generally circular shape and is centered on the axis A.

The wall 110 is elongated circumferentially partially around the top surface 108. The wall 110 is elongated along an outer edge of the top surface 108 at which the top surface 108 meets the lateral surface 134. The wall 110 is elongated along a vehicle-forward portion of the edge of the top surface 108. The wall 110 is elongated circumferentially at most 180° around the axis A, e.g., along a front-facing portion of the outer edge of the top surface 108. The wall 110 has a midpoint M about which the wall 110 is symmetrical. The midpoint M can be at a vehicle-forwardmost point of the top surface 108. The wall 110 can help prevent water from draining forward from the top surface 108 across the sensor window 104.

Figure 5:
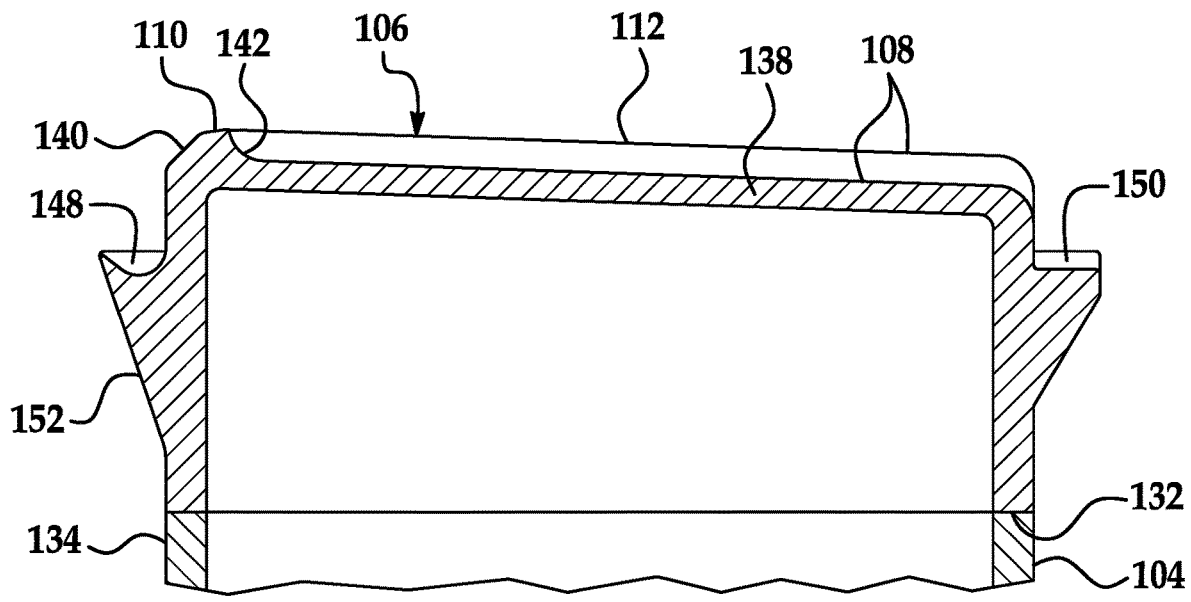
FIG. 5 is a side cross-sectional view of the sensor-housing cap.

With reference to FIG. 5, the wall 110 extends upward from the top surface 108. A height of the wall 110 measured from troughs 138, i.e., low points, of the top surface 108 is at least as great as a height of the ridges 112 from the troughs 138. The height of the wall 110 can be constant along the elongation of the wall 110 or can be highest at the midpoint of the wall 110. The wall 110 includes a front surface 140 facing radially outward relative to the axis A and a rear surface 142 facing radially inward relative to the axis A. An incline of the rear surface 142 is closer to vertical than an incline of the front surface 140. For example, the front surface 140 can have an incline of approximately 45°, and the rear surface 142 can have an incline of 90° or even an incline greater than 90°, i.e., an incline creating an overhang.

Figure 6:
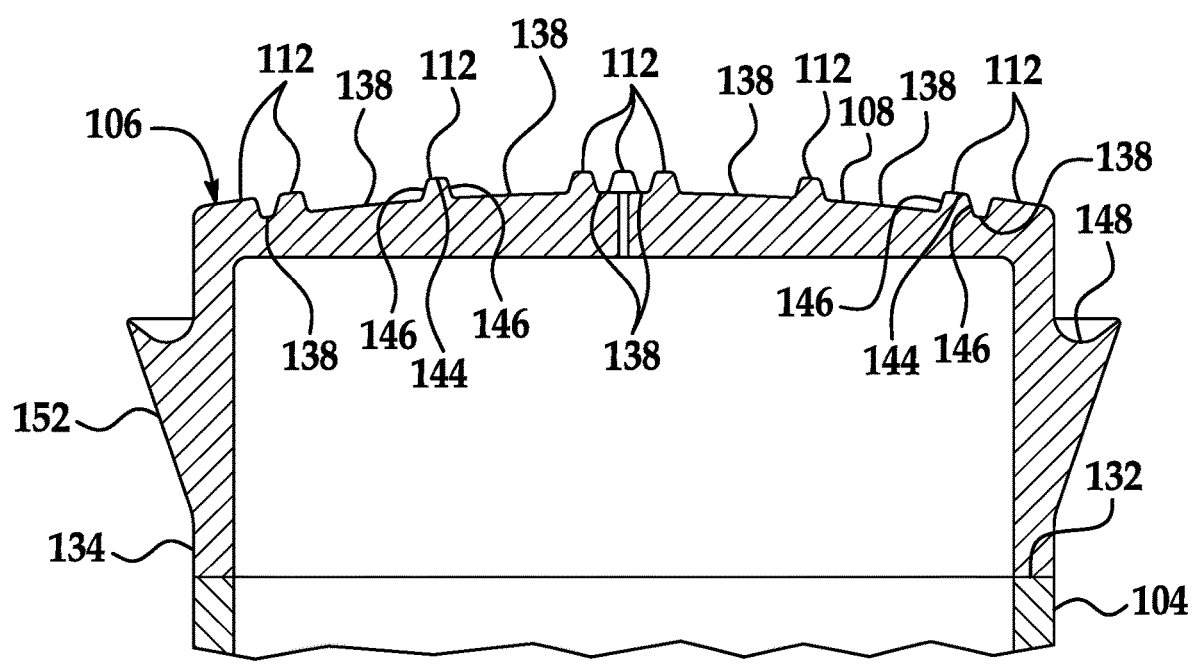
FIG. 6 is a front cross-sectional view of the sensor-housing cap.

Returning to FIG. 4, the top surface 108 includes the ridges 112 elongated from the wall 110 parallel to each other. Specifically, the ridges 112 are parallel to a vertical plane P containing the axis A and the midpoint M of the wall 110; i.e., the ridges 112 are elongated from the wall 110 in a vehicle-rearward direction to an edge of the top surface 108. With reference to FIG. 6, each ridge 112 includes a crest 144 and two side surfaces 146 extending upward at oblique angles from the troughs 138 to the crests 144. A cross-sectional shape of the ridge 112 can be constant from the wall 110 to the edge of the top surface 108.

With reference to FIG. 6, the top surface 108 includes a plurality of the troughs 138 alternated with the ridges 112. The troughs 138 are elongated parallel to the ridges 112 from the wall 110 to the edge of the top surface 108. Some of the troughs 138 are wider than the ridges 112 adjacent to those troughs 138 in a direction perpendicular to a direction of elongation of the ridges 112, i.e., a vehicle-lateral direction. These wide troughs 138 can provide sufficient drainage of water during heavy rain.

Returning to FIG. 4, the sensor-housing cap 106 includes a gutter 148. The gutter 148 is elongated circumferentially around the axis A, e.g., elongated circumferentially more than 270° around the axis A, e.g., elongated circumferentially from a channel 150 (described below) to the channel 150. The gutter 148 is positioned vertically below the top surface 108 and vertically above the sensor window 104. The gutter 148 is positioned radially outside the top surface 108 relative to the axis A. The positioning of the gutter 148 permits the gutter 148 to catch water draining downward from the top surface 108. The gutter 148 can slope down gradually from front to back, i.e., from in front of the midpoint M of the wall 110 to the channel 150. The slope of the gutter 148 can help water in the gutter 148 drain to the channel 150.

Returning to FIGS. 4 and 5, the sensor-housing cap 106 includes the channel 150. The channel 150 extends radially outward relative to the axis A from the gutter 148. The channel 150 is lower than an upper height of the gutter 148 adjacent to the channel 150. The channel 150 can be positioned at a rearwardmost position on the sensor-housing cap 106, which is also a lowest point of the gutter 148.

The sensor-housing cap 106 includes a ramp 152 on an underside of the gutter 148. The ramp 152 is elongated circumferentially around the axis A, e.g., elongated circumferentially more than 270° around the axis A, e.g., elongated circumferentially 360° around the axis A. The ramp 152 is positioned vertically below the top surface 108 and vertically above the sensor window 104. The ramp 152 is positioned radially outside the top surface 108 relative to the axis A. The ramp 152 has a cross-section elongated circumferentially, and the cross-section extends upwardly and radially outwardly. A lower edge of the ramp 152 can have a diameter equal to the outer diameter of the sensor window 104, and an upper edge of the ramp 152 can have a diameter equal to an outer diameter of the gutter 148. The cross-section of the ramp 152 extends smoothly from the lower edge to the upper edge in an upward and radially outward direction. When water such as precipitation lands on the sensor window 104, the air nozzles 136 blow the water upward to the ramp 152. The shape of the ramp 152 permits the water to fly off the sensor housing 126 rather than collecting at a location on the sensor housing 126.

The disclosure has been described in an illustrative manner, and it is to be understood that the terminology which has been used is intended to be in the nature of words of description rather than of limitation. Terms such as "front," "forward," "back," "rearward," "left," "right," "side," "vertical," etc., are understood relative to the vehicle 100. Many modifications and variations of the present disclosure are possible in light of the above teachings, and the disclosure may be practiced otherwise than as specifically described.

The invention claimed is:

1. A sensor apparatus comprising:
   a cylindrical sensor window defining an axis oriented vertically; and
   a sensor-housing cap mounted on the sensor window;
   wherein the sensor-housing cap includes a top surface and a wall;
   the axis intersects the top surface;
   the wall extends upward from the top surface and is elongated circumferentially partially around the top surface; and
   the top surface includes a plurality of ridges elongated from the wall, the ridges being elongated parallel to each other along a horizontal direction.

2. The sensor apparatus of claim 1, wherein the sensor-housing cap includes a gutter elongated circumferentially around the axis and positioned below the top surface, above the sensor window, and radially outside the top surface relative to the axis.

3. The sensor apparatus of claim 2, wherein the gutter is elongated circumferentially at least 270° around the axis.

4. The sensor apparatus of claim 2, wherein the sensor-housing cap includes a channel defining a flow direction for fluid in the gutter, the flow direction extending radially outward relative to the axis from the gutter.

5. The sensor apparatus of claim 4, wherein the gutter is elongated circumferentially around the axis from the channel to the channel.

6. The sensor apparatus of claim 5, wherein the channel extends from a lowest point of the gutter.

7. The sensor apparatus of claim 4, wherein the wall has a midpoint about which the wall is symmetrical, and a vertical plane extends through the midpoint of the wall, the axis, and the channel.

8. The sensor apparatus of claim 1, wherein the top surface slopes downward from the wall in a direction parallel to the ridges.

9. The sensor apparatus of claim 1, wherein the wall is elongated circumferentially at most 180° around the axis.

10. The sensor apparatus of claim 1, wherein the wall has a midpoint about which the wall is symmetrical, and the ridges are parallel to a vertical plane containing the axis and the midpoint of the wall.

11. The sensor apparatus of claim 1, wherein the top surface includes a plurality of troughs alternated with the ridges, and at least one of the troughs is wider than the ridges adjacent to that trough.

12. The sensor apparatus of claim 1, wherein the top surface includes a plurality of troughs alternated with the ridges, and each ridge includes two side surfaces extending upward at oblique angles from the troughs.

13. The sensor apparatus of claim 1, wherein the sensor-housing cap includes a ramp elongated circumferentially around the axis and positioned below the top surface, above the sensor window, and radially outside the top surface relative to the axis.

14. The sensor apparatus of claim 13, wherein the ramp has a cross-section elongated circumferentially around the axis, and the cross-section extends upwardly and radially outwardly.

15. The sensor apparatus of claim 14, wherein the ramp is elongated circumferentially at least 270° around the axis.

16. The sensor apparatus of claim 1, wherein the sensor-housing cap is a single piece.

17. The sensor apparatus of claim 1, wherein the wall connects the ridges together above the top surface.

* * * * *